US011556135B2

(12) United States Patent
Takaki et al.

(10) Patent No.: US 11,556,135 B2
(45) Date of Patent: Jan. 17, 2023

(54) METHOD, DEVICE, AND SYSTEM OF CONTROLLING MOVEMENT OF MULTI-VEHICLE, AND COMPUTER-READABLE STORAGE MEDIUM

(71) Applicants: MITSUBISHI HEAVY INDUSTRIES, LTD., Tokyo (JP); National University Corporation Tokai National Higher Education and Research System, Aichi (JP)

(72) Inventors: Kazushige Takaki, Tokyo (JP); Yasuo Fujishima, Tokyo (JP); Shunichi Azuma, Aichi (JP)

(73) Assignees: MITSUBISHI HEAVY INDUSTRIES, LTD., Aichi (JP); NATIONAL UNIVERSITY CORPORATION TOKAI NATIONAL HIGHER EDUCATION AND RESEARCH SYSTEM, Aichi (JP)

( * ) Notice: Subject to any disclaimer, the term of this patent is extended or adjusted under 35 U.S.C. 154(b) by 162 days.

(21) Appl. No.: 17/089,300

(22) Filed: Nov. 4, 2020

(65) Prior Publication Data
US 2021/0141391 A1 May 13, 2021

(30) Foreign Application Priority Data
Nov. 8, 2019 (JP) .............................. JP2019-203242

(51) Int. Cl.
*G05D 1/02* (2020.01)
*B60W 30/095* (2012.01)
(Continued)

(52) U.S. Cl.
CPC ....... *G05D 1/0289* (2013.01); *B60W 30/0956* (2013.01); *B60W 30/162* (2013.01);
(Continued)

(58) Field of Classification Search
CPC .. G05D 1/0289; G05D 1/0214; G05D 1/0223; G05D 1/0291; B60W 30/0956;
(Continued)

(56) References Cited

U.S. PATENT DOCUMENTS

2008/0147319 A1* 6/2008 Cubillo ................. G01C 21/32
701/431
2010/0110105 A1* 5/2010 Kinnunen .......... G01C 21/3664
345/629
(Continued)

FOREIGN PATENT DOCUMENTS

JP 4138541 8/2008

OTHER PUBLICATIONS

Extended European Search Report dated Mar. 29, 2021 in European Application No. 20205879.8.
(Continued)

*Primary Examiner* — Hussein Elchanti
(74) *Attorney, Agent, or Firm* — Wenderoth, Lind & Ponack, L.L.P.

(57) ABSTRACT

A method of controlling movement of multi-vehicle includes acquiring a constraint condition under which vehicles move and a calculation cycle for calculating movement routes of the vehicles; acquiring a position of each vehicle; specifying a target position for each vehicle; calculating, based on the position of each vehicle, the target position, and the constraint condition, a movement route for prediction steps of each vehicle; determining, based on the movement routes of the vehicles, a driving condition of each vehicle from a current time to a unit time; and controlling movement of each vehicle. Calculating the movement route including performing optimization calculation based on an evaluation function, evaluation of which becomes higher as a deviation between the vehicle and the target position for each predic-
(Continued)

tion step becomes smaller, and the constraint condition, to calculate the movement route.

12 Claims, 5 Drawing Sheets

(51) Int. Cl.
  *B60W 30/16* (2020.01)
  *B60W 50/00* (2006.01)
  *G01C 21/34* (2006.01)
  *G08G 1/00* (2006.01)

(52) U.S. Cl.
  CPC ..... *B60W 50/0097* (2013.01); *G01C 21/3407* (2013.01); *G01C 21/3461* (2013.01); *G05D 1/0214* (2013.01); *G05D 1/0223* (2013.01); *G05D 1/0291* (2013.01); *G08G 1/20* (2013.01); *G08G 1/22* (2013.01); *B60W 2520/10* (2013.01); *B60W 2554/802* (2020.02)

(58) Field of Classification Search
  CPC ............ B60W 30/162; B60W 50/0097; G01C 21/3407; G01C 21/3461; G08G 1/20; G08G 1/22

See application file for complete search history.

(56) References Cited

U.S. PATENT DOCUMENTS

| | | | | |
|---|---|---|---|---|
| 2012/0166076 | A1* | 6/2012 | Hardy | G01C 21/3415 701/414 |
| 2014/0277888 | A1* | 9/2014 | Dastoor | B60L 3/12 701/22 |
| 2016/0019434 | A1* | 1/2016 | Caldwell | G06V 40/23 345/474 |
| 2016/0154538 | A1* | 6/2016 | Wang | G01C 21/3664 715/771 |
| 2018/0299284 | A1* | 10/2018 | Wang | G01C 21/3694 |
| 2019/0170527 | A1* | 6/2019 | Inoue | G01C 21/26 |
| 2019/0206254 | A1* | 7/2019 | Tao | B60W 50/14 |
| 2020/0020227 | A1* | 1/2020 | Ran | G08G 1/075 |
| 2020/0020234 | A1* | 1/2020 | Cheng | G08G 1/0112 |
| 2020/0207343 | A1* | 7/2020 | Vassilovski | H04W 4/44 |
| 2020/0239031 | A1* | 7/2020 | Ran | G08G 1/0145 |
| 2020/0388161 | A1* | 12/2020 | Kim | G08G 1/096791 |

OTHER PUBLICATIONS

Michael Hoy et al., "Collision free cooperative navigation of multiple wheeled robots in unknown cluttered environments", Robotics and Autonomous Systems, vol. 60, No. 10, Oct. 1, 2012, pp. 1253-1266, XP055785296.

Hui Cheng et al., "Decentralized navigation of multiple agents based on ORCA and model predictive control", 2017 IEEE/RSJ International Conference on Intelligent Robots and Systems (IROS), Sep. 24, 2017, pp. 3446-3451, XP033266335.

Lynne E. Parker, "Path Planning and Motion Coordination in Multiple Mobile Robot Teams", in Encyclopedia of Complexity and System Science, Jan. 1, 2009, XP055785362.

* cited by examiner

METHOD, DEVICE, AND SYSTEM OF CONTROLLING MOVEMENT OF MULTI-VEHICLE, AND COMPUTER-READABLE STORAGE MEDIUM

CROSS-REFERENCE TO RELATED APPLICATIONS

The present application claims priority to and incorporates by reference the entire contents of Japanese Patent Application No. 2019-203242 filed in Japan on Nov. 8, 2019.

FIELD

The present disclosure relates to a method, a device, and a system of controlling movement of multi-vehicle, and a computer-readable storage medium.

BACKGROUND

One of the technologies for moving multi-vehicle (Swarm technologies) is a method for controlling movement of a plurality of transportation devices for transporting pieces of baggage (for example, Japanese Patent No. 4138541). The device disclosed in Japanese Patent No. 4138541 indicates that a central processing unit creates an evaluation index such that a total transportation time or a total transportation distance of all transportation devices becomes shortest, sets a route, and controls the movement of each transportation device based on the route.

As in Japanese Patent No. 4138541, in order to set a path through which a vehicle as a transportation device can pass and set a route in which the vehicle moves through the path, information on paths needs to be set in advance, which requires a lot of work. In the case of setting a route based on paths, the degree of freedom of routes that can be set is low.

Swarm technologies include a method for setting a region with respect to the current position of each vehicle and controlling the movement of the vehicle based on information on the region. In the case of processing in which multiple vehicles are each moved to a target position while controlling a movement route in environments where an obstacle is present around the vehicles, it is difficult to appropriately control the movement by the above-mentioned control.

SUMMARY OF THE INVENTION

The present disclosure has been made in view of the above-mentioned circumstances, and it is an object of the present disclosure to provide a method, a device, and a system for controlling movement of multi-vehicle, and a computer-readable storage medium, which are capable of efficiently moving multiple vehicles to respective target positions when moving the multiple vehicles to respective targets.

To solve the problems described above and achieve the object, a first aspect according to the present invention is a method of controlling movement of multi-vehicle. The method includes acquiring a constraint condition under which multiple vehicles move and a calculation cycle for calculating movement routes of the vehicles; acquiring a position of each of the vehicles; specifying a target position for each vehicle; calculating, based on the position of each of the vehicles, the target position, and the constraint condition, a movement route for prediction steps of each of the vehicles; determining, based on the movement routes of the vehicles, a driving condition of each of the vehicles from a current time to a unit time; and controlling movement of each of the vehicles. Calculating the movement route including performing optimization calculation based on an evaluation function, evaluation of which becomes higher as a deviation between the vehicle and the target position for each prediction step becomes smaller, and the constraint condition, to calculate the movement route.

A second aspect according to the present invention is a device for controlling movement of multi-vehicle. The device includes a communication unit that communicates with each of multiple vehicles to acquire information on current positions of the vehicles and acquire information on target positions of the vehicles; and a control unit that acquires a constraint condition under which the vehicles move and a calculation cycle for calculating movement routes of the vehicles, calculates, based on the position of each of the vehicles, the target position, and the constraint condition, a movement route for prediction steps of each of the vehicles, and determines, based on the movement routes, a driving condition of each of the vehicles from a current time to a unit time to control the movement of the vehicles. The control unit performs optimization calculation based on an evaluation function, evaluation of which becomes higher as a deviation between the vehicle and the target position for each prediction step becomes smaller and the constraint condition, to calculate the movement routes.

A third aspect according to the present invention is a system for controlling movement of multi-vehicle. The system includes multiple vehicles; and a movement control device that moves the vehicles. The movement control device includes a communication unit that communicates with each of the vehicles to acquire information on current positions of the vehicles and acquire information on target positions of the vehicles; and a control unit that acquires a constraint condition under which the vehicles move and a calculation cycle for calculating movement routes of the vehicles, calculates, based on the position of each of the vehicles, the target position, and the constraint condition, a movement route for prediction steps of each of the vehicles, and determines, based on the movement routes, a driving condition of each of the vehicles from a current time to a unit time to control the movement of the vehicles. The control unit performs optimization calculation based on an evaluation function, evaluation of which becomes higher as a deviation between the vehicle and the target position for each prediction step becomes smaller and the constraint condition, to calculate the movement routes.

A fourth aspect according to the present invention is a computer-readable storage medium stored thereon a computer program for moving multi-vehicle. The computer program causes a computer to execute processing including acquiring a constraint condition under which multiple vehicles move and a calculation cycle for calculating movement routes of the vehicles; acquiring a position of each of the vehicles; specifying a target position for each vehicle; calculating, based on the position of each of the vehicles, the target position, and the constraint condition, a movement route for prediction steps of each of the vehicles; determining, based on the movement routes of the vehicles, a driving condition of each of the vehicles from a current time to a unit time; and controlling movement of each of the vehicles. Calculating the movement route including performing optimization calculation based on an evaluation function, evaluation of which becomes higher as a deviation between the vehicle and the target position for each prediction step becomes smaller, and the constraint condition, to calculate the movement route.

Advantageous Effects of Invention

According to at least one embodiment of the present disclosure, vehicles can be efficiently moved to respective target positions when the vehicles are moved to respective targets.

DESCRIPTION OF EMBODIMENTS

Figure 1:
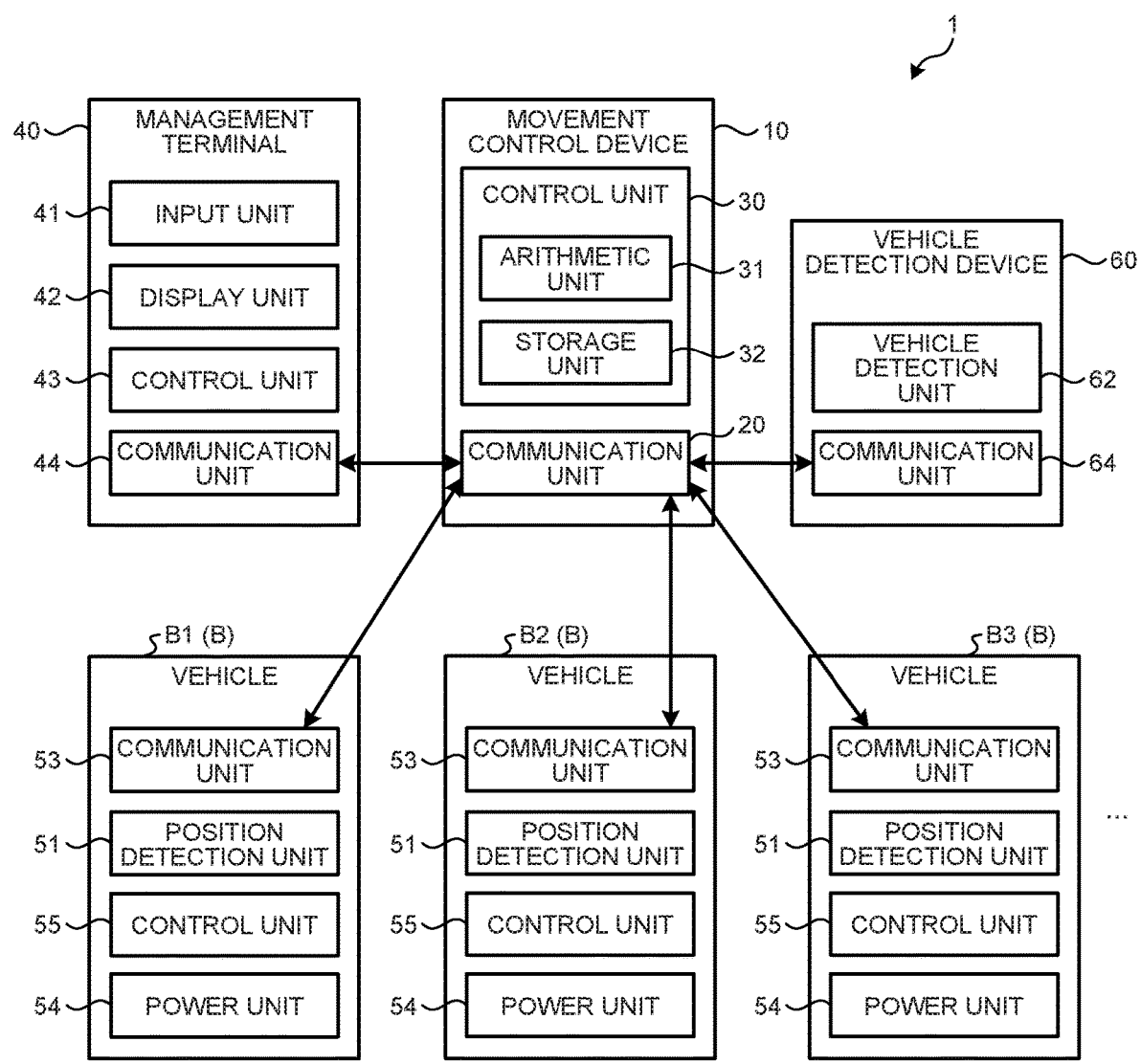
FIG. 1 is a block diagram illustrating a main configuration of a movement control system including a movement control device in a first embodiment.

Referring to the drawings, some embodiments of the present disclosure are described in detail below. Note that the present invention is not limited by the embodiments.

Components in the embodiments include the ones that can be easily replaced by a person skilled in the art or the ones that are substantially the same. Furthermore, the components described below can be combined as appropriate.

First Embodiment

FIG. 1 is a block diagram illustrating a main configuration of a movement control system 1 including a movement control device 10 in a first embodiment. The movement control system 1 is a system for controlling movement routes for multiple vehicles B to a target position T in a region where an obstacle is present. The movement control device 10 controls the movement of the vehicles B. In FIG. 1 and other figures, the vehicles B are denoted by B1, B2, B3 . . . BM for the purpose of distinguishing from one vehicle B to another. The vehicle B may be a mobile object that travels on the ground, a mobile object that flies in the sky, or a mobile object that moves in water. Thus, the vehicle B includes a mobile object that can move three-dimensionally, but in the following, the case where the vehicle B moves on a two-dimensional plane is described for the sake of description. Specific examples of the movement control system 1 include a case where the movement control system 1 is used for movement control of vehicles for moving materials and articles in a warehouse. In this case, a target position is a position at which an object to be transported is present or a position to which an object to be transported is transported. Examples of obstacles in a target region include a piece of baggage, a material, and a wall that are not transportation targets.

The movement control system 1 includes the vehicles B, the movement control device 10, a management terminal 40, and a vehicle detection device 60. Each of the vehicles B includes a position detection unit 51, a communication unit 53, and a power unit 54. The position detection unit 51 detects the position of a vehicle B in which the position detection unit 51 is provided. Specific configuration examples of the position detection unit 51 include a measurement device for transmitting and receiving signals to and from reference devices located at a plurality of positions in a target region and detecting the position of an own device based on relative positions with respect to the reference devices, a measurement device for acquiring surrounding image and shape information and collating with three-dimensional shape data in a target region prepared in advance to detect the position of an own device, and a positioning device for detecting positions by using a positioning system such as a global positioning system (GPS). The position detection unit 51 may be an inertial navigation device for detecting a position with respect to a predetermined start point.

The communication unit 53 communicates with the movement control device 10. Specific configuration examples of the communication unit 53 include a wireless communication device. The communication unit 53 may perform wired communication with the movement control device 10.

The power unit 54 functions as power for moving the vehicle B. The specific configuration of the power unit 54 depends on operation forms of the vehicle B. As an example, when the vehicle B is a vehicle that travels on the ground, the power unit 54 includes a plurality of wheels and a motor for driving a part or whole of the wheels. The exemplified specific configuration of the power unit 54 is merely an example, and the configuration is not limited thereto. The power unit 54 only needs to function as power that enables the vehicle B to move.

The control unit 55 controls the behavior of the power unit 54 based on information acquired through the communication unit 53.

The movement control device 10 includes a communication unit 20 and a control unit 30. The communication unit 20 communicates with the vehicles B, the management terminal 40, and the vehicle detection device 60. The communication between the movement control device 10 and the vehicle B is performed by communication between the position detection unit 51 and the communication unit 20. The specific configuration of the communication unit 20 is common to the position detection unit 51.

The control unit 30 includes an arithmetic unit 31 and a storage unit 32. The arithmetic unit 31 includes an arithmetic circuit such as a central processing unit (CPU), and performs various kinds of processing related to the movement control of the vehicles B. The storage unit 32 stores therein software/computer program (hereinafter simply referred to as a "computer program") and data used for the processing of the arithmetic unit 31. The computer program may be stored in the storage unit 32, or may be stored in a storage medium that can be read by the movement control device 10 as a computer. In this case, the movement control device 10 includes a reading device for reading the computer program from the storage medium. The storage unit 32 stores therein information on the vehicles B acquired through the communication unit 20. For example, the storage unit 32 stores therein constraint conditions and observation conditions used for controlling the movement of vehicles B described later. Information indicating target position (for example, target positions T1, T2, ..., Tm) of the vehicles B described later is stored in the storage unit 32. The target position is a target to be observed by the vehicle B or a target position of the vehicle B. The target position may be fixed or movable.

The management terminal 40 is a device used for an operator to input and check various kinds of information. The management terminal is a personal computer, a tablet, or the like. The management terminal 40 includes an input unit 41, a display unit 42, a control unit 43, and a communication unit 44. The input unit 41 is a touch panel, a mouse, a keyboard, a microphone, or the like, and detects operations by an operator. The display unit 42 displays images. On the display unit 42, information necessary for the operator to operate the movement control system 1, such as an operation screen and an operation result screen, is displayed. The control unit 43 controls the operations of the units in the management terminal 40. The communication unit 44 communicates with the communication unit 20 in the movement control device 10. The management terminal 40 transmits searching information to the movement control device 10, and receives information acquired and generated by the movement control device 10.

The vehicle detection device 60 detects the position of a vehicle B located in a target region. The vehicle detection device 60 includes a vehicle detection unit 62 and a communication unit 64. The vehicle detection unit 62 detects a vehicle B located in a region to be detected. The vehicle detection unit 62 can use a camera, a communication device for communicating with a vehicle B, a temperature sensor, a shape detection sensor, and the like. The vehicle detection device 60 acquires various kinds of information on the region to be detected, thereby detecting the vehicle B located in the region to be detected. The communication unit 64 communicates with the communication unit 20 in the movement control device 10, and transmits information on the detected vehicle. Note that the movement control system 1 in the present embodiment is provided with the vehicle detection device 60, but when the vehicle B can specify the position of its own vehicle, the vehicle detection device 60 may be omitted.

Figure 2:
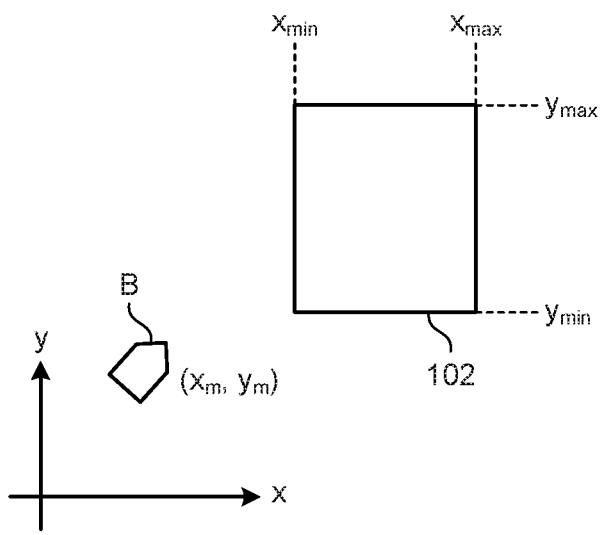
FIG. 2 is a schematic diagram illustrating an example of a relation between a vehicle and an obstacle.
Figure 3:
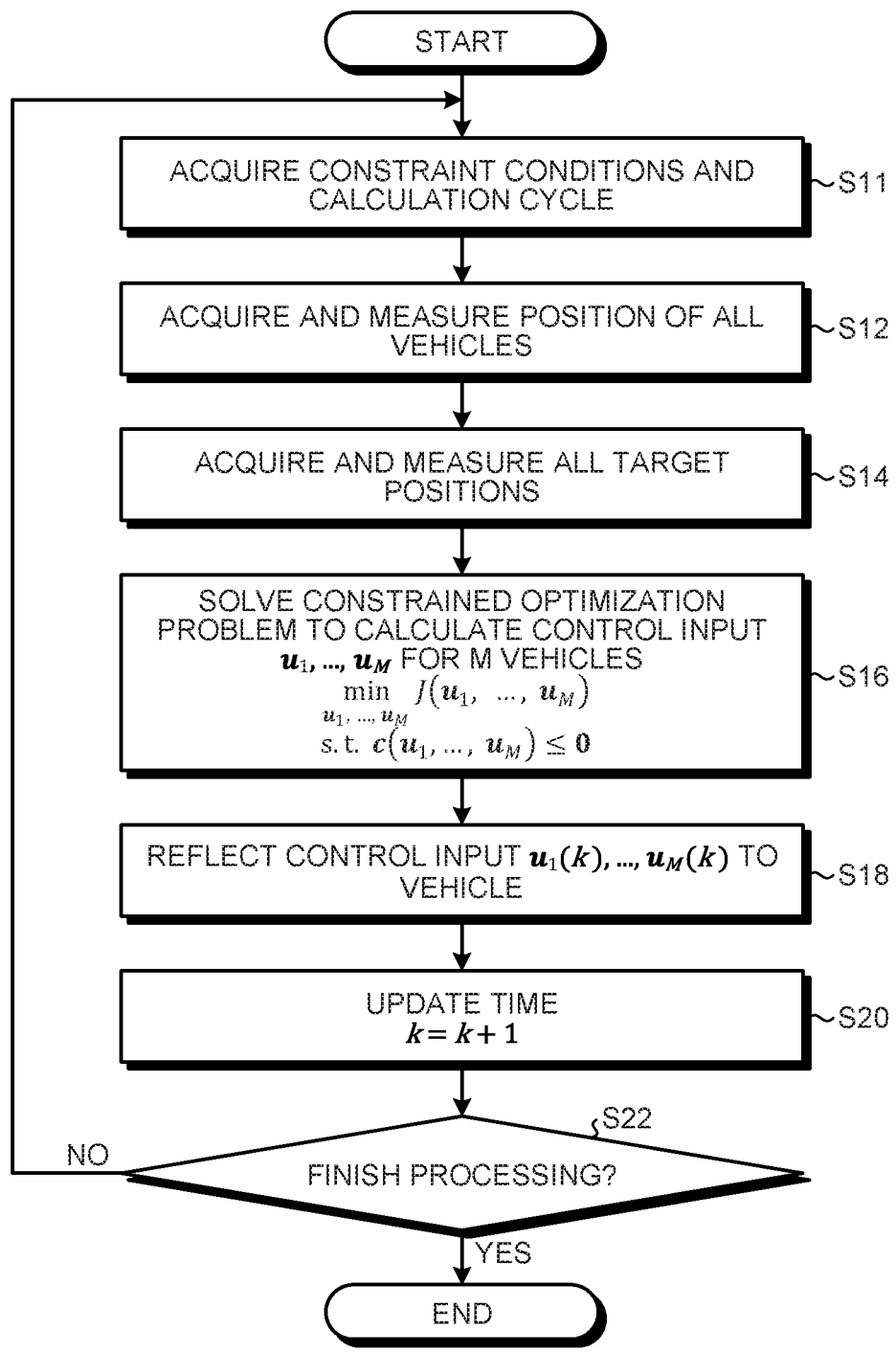
FIG. 3 is a flowchart illustrating a procedure of processing performed by the movement control system in the first embodiment.
Figure 4:
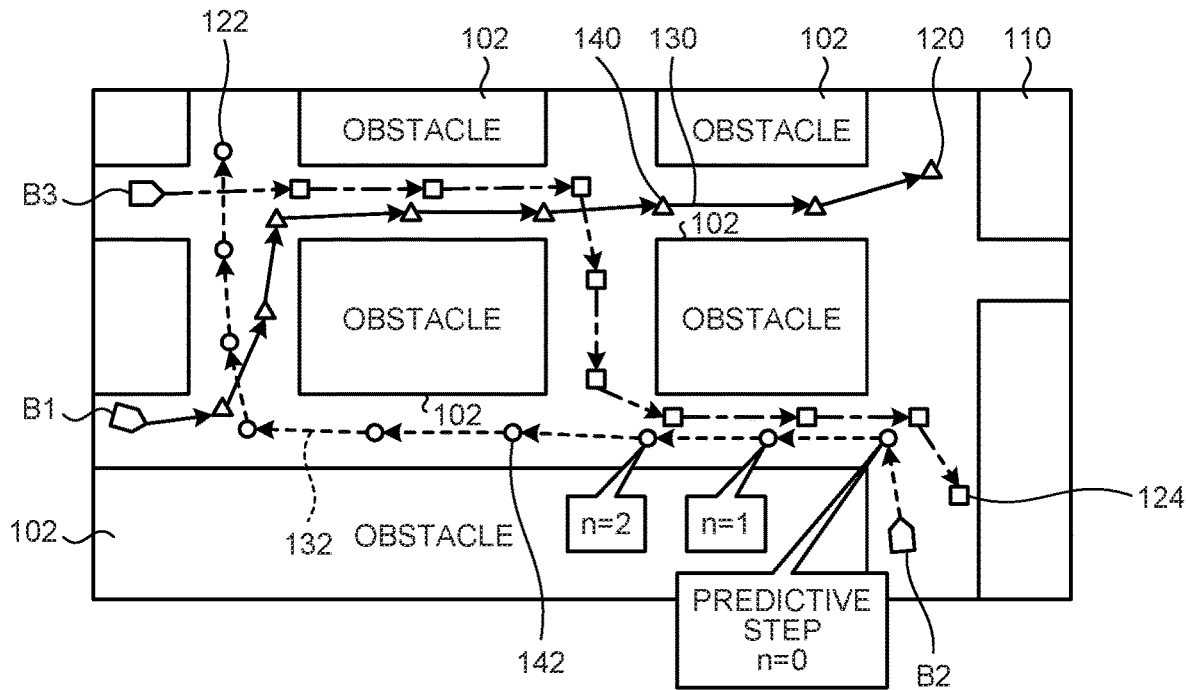
FIG. 4 is a schematic diagram illustrating an example of the processing performed by the movement control system in the first embodiment.

Next, the movement of multi-vehicle by the movement control system 1 is described with reference to FIG. 2 to FIG. 4. FIG. 2 is a schematic diagram illustrating an example of the relation between a vehicle and an obstacle. FIG. 3 is a flowchart illustrating the procedure of processing performed by the movement control system in the first embodiment. FIG. 4 is a schematic diagram illustrating an example of the processing performed by the movement control system in the first embodiment.

The movement control system 1 in the present embodiment moves multi-vehicle B to respective target positions (designated locations, designated positions) in a target region in which an obstacle is present so that a movable region is restricted. The management terminal 40 transmits information on the obstacle and information on movement constraint conditions to the movement control device 10 through the communication unit 44. Each of the vehicles B transmits information indicating the position acquired by the position detection unit 51 to the movement control device 10 through the communication unit 53. The vehicle detection unit 62 transmits information on the vehicles B detected in the target region to the movement control device 10 through the communication unit 64. The storage unit 32 cumulatively stores therein information indicating the positions of the vehicles B, information on target positions T of the vehicles B, and information on obstacles. The arithmetic unit 31 calculates and evaluates a movement route for each of the vehicles B based on information indicating the positions of the vehicles B, information indicating the target positions, and constraint conditions including position information on obstacles, determines a movement route based on the evaluation results, calculates control input for each of the vehicles B based on the determined movement route, and individually transmits the control input to the vehicles B through the communication unit 20. The control input functions as information indicating a moving direction and moving speed for moving each of the vehicles B while satisfying predetermined conditions in unit time. The vehicle B operates the power unit 54 so as to move in accordance with the control input. The storage unit 32 cumulatively stores therein the control input transmitted to each of the vehicles B.

Next, the processing of the movement control device 10 is described. The movement control device 10 optimizes the movement route for each vehicle to a target position such that the throughput of the entire vehicle group of the vehicles B is improved. In the movement control device 10 in the present embodiment, three constraint conditions for the movement of vehicles B, that is, "vehicle B does not approach another vehicle B by distance $d_A$ [m] or more", "vehicle B does not approach obstacle 102 by distance $d_B$ [m] or more", and upper/lower limit values of vehicle speed, are set. As speed limit values of the vehicle B, an upper limit $v_{max}$ and a lower limit $v_{min}$ are set. The upper limit $v_{max}$ of the speed of the vehicle B is set depending on the performance of the vehicle B and limit values imposed on a region to which the vehicle B is to be moved. When the vehicle B travels on the ground as in the present embodiment, the stop of the vehicle B is allowed, and hence $v_{min}=0$ can be set. When the vehicle B moves in the sky or in water and cannot hover, the lower limit $v_{min}$ is speed that can maintain the rotation in the sky or in water.

First, control input at a current time k to vehicles m (m=1, 2, 3, ..., M) identifying vehicles B is represented by $u_m(k)$. M indicates the total number of vehicles. In the present embodiment, the vehicles have only motion on a two-dimensional xy plane for simplicity, and the control input uses speed $u_{mx}(k)$ of the vehicle in an x-axis direction and speed $u_{my}(k)$ in a y-axis direction. The control input $u_m(k)$ is represented by:

$$u_m(k)=[u_{mx}(k)u_{my}(k)]^T, \ m=1,2,\ldots,M$$

The movement control device 10 includes a predictive number of steps (called "predictive horizon") $N_H$ predicted by model predictive control, and predicts a route in the future. The control input u for the future route, that is, each step from the current time k to $k+N_H-1$ after the predictive number of steps $N_H$ is represented by:

$$u_m=[u_m(k),\ldots,u_m(k+N_H-1)]^T, \ m=1,2,\ldots,M$$

Next, processing for converting the above-mentioned three constraint conditions into mathematical expressions for applying model predictive control, which is constrained optimization for calculating a movement route, is described. The movement control device 10 performs optimization calculation under conditions that constraint conditions are satisfied at all predictive steps k=1, ..., $N_H$.

The constraint condition "vehicle does not approach another vehicle by distance $d_A$ [m] or more" is represented by:

$$|p_m(k)-p_l(k)|\geq d_A$$

where $m\neq l$, m=1, ..., M, l=1, ..., M

Here, $p_m(k)=[x_m(k)y_m(k)]^T$ and $q_m(k)=[x'_m(k)y'_m(k)]^T$ are coordinates on the xy plane of the vehicle m and the target position T with respect to the vehicle m, respectively.

Next, the constraint condition "vehicle B does not approach obstacle by distance $d_B$ [m] or more" is represented by:

$$x_m(k) < x_{min} - d_B$$

$$\text{or } x_m(k) > x_{max} + d_B$$

$$\text{or } y_m(k) < y_{min} - d_B$$

$$\text{or } y_m(k) > y_{max} + d_B$$

The positional relation between the vehicle B and the obstacle 102 is set as illustrated in FIG. 2. As illustrated in FIG. 2, $x_{min}$ is a minimum x coordinate of the obstacle, $x_{max}$ is a maximum x coordinate of the obstacle, and $y_{min}$ is a minimum y coordinate of the obstacle. Also, $y_{max}$ is a maximum y coordinate of the obstacle. FIG. 2 illustrates the relation between one vehicle and one obstacle, but the number of obstacles in a target region is not limited to one, and a plurality of obstacles can be defined. In the movement control device 10, the number of mathematical expressions of the constraint conditions increases in proportion to the number of obstacles.

Next, "speed of vehicle B is upper limit $v_{max}$ and lower limit $v_{min}$" is represented by:

$$\sqrt{u_{mx}^2(k) + u_{my}^2(k)} \leq v_{max}$$

$$\sqrt{u_{mx}^2(k) + u_{my}^2(k)} \geq v_{min}$$

The number of constraint conditions of the speed of the vehicle is proportional to the number of vehicles, and is also proportional to the predictive number of steps $N_H$.

For the constraint conditions, it is necessary to describe control input in order to apply model predictive control. Thus, the future position of the vehicle after n steps is represented by:

$$p_m(k+n) = p_m(k) + T_S \sum_{j=0}^{n} u_m(k+j)$$

The position of the vehicle at each step is substituted into the constraint condition. Accordingly, the constraint condition can be converted into a function related to the control input, and model predictive control can be applied. Note that, as a kinetic model, nonholonomic models such as an equivalent two-wheel model of a vehicle may be used.

Next, the movement control device 10 sets an evaluation function $J_m(u_1 \ldots, u_M)$ represented by:

$$J_m(u_1, \ldots, u_M) = \sum_{m=1}^{M} \sum_{n=0}^{N_H-1} e_m^T(k+n) e_m(k+n)$$

Note that the evaluation function is an example, and is not limited thereto. $e_m(k+n) \in R^{2 \times 1}$ is a deviation between a position predicted value of the vehicle at a time after n steps and the target position. The deviation in position is represented by:

$$e_m(k+n) = p_m(k+n) - q_m(k)$$
$$= p_m(k) + T_S \sum_{j=0}^{n} u_m(k+j) - q_m(k)$$

By using the evaluation function $J_m(u_1 \ldots, u_m)$ in the present embodiment, the final arrival time at a time after the lapse of the predictive number of steps $N_H$ and errors from a destination at locations at all predictive steps can be evaluated. In this manner, the distance from the vehicle B to the destination can be minimized. By using the evaluation function $J_m(u_1 \ldots, u_M)$, all vehicles can be collectively evaluated, and the movement of the entire vehicle group can be optimized.

The movement control device 10 uses the evaluation function and the constraint conditions defined as described above to solve the following constrained optimization problem for each arithmetic cycle, thereby determining optimal control input.

$$\min_{u_1, \ldots, u_M} J(u_1, \ldots, u_M)$$

$$\text{s.t. } c(u_1, \ldots, u_M) \leq 0$$

The movement control device 10 outputs the calculated control input to each vehicle.

Next, an example of the processing executed by the movement control device 10 is described with reference to FIG. 3. The movement control device 10 acquires a constraint condition and a calculation cycle (Step S11). The movement control device 10 acquires information input to the management terminal 40, and acquires a constraint condition. The movement control device 10 acquires information input to the management terminal 40, and calculates a calculation cycle, that is, a calculation cycle (time for one prediction step) for calculating the movement route of the vehicle B. Note that the movement control device 10 may acquire constraint conditions, or may acquire information on thresholds and obstacles necessary for constraint conditions and create constraint conditions based on the acquired information. When the movement control device 10 does not update constraint conditions while controlling the movement of vehicles, the movement control device 10 is not necessarily required to execute a series of processing for acquiring constraint conditions, and may execute the processing in advance.

The movement control device 10 acquires and measures the positions of all vehicles B (Step S12). The movement control device 10 acquires position information measured and detected by the position detection unit 51 from the vehicle B through the communication unit 20. The movement control device 10 may acquire position information on the vehicle B measured by the vehicle detection device 60 through the communication unit 20. The movement control device 10 may acquire rotation information in addition to the position information on the vehicles B.

Next, the movement control device 10 acquires and measures all target positions (Step S14). The movement control device 10 acquires information on a target position set for each of the vehicles B. The target position can be acquired based on information output from the management terminal 40. Examples of the information output from the management terminal 40 include information on the target position itself and information on work executed by the vehicle. Examples of the information on work executed by the vehicle include information on baggage transported in a warehouse (information on current position of baggage and position to which baggage is transported). Based on the information on the vehicle B and the information on baggage transported in a warehouse, the movement control device determines a transportation plan for the baggage and the vehicle B for transporting each piece of baggage, and determines a target position of the vehicle.

After the movement control device 10 acquires the constraint conditions, the positions of vehicles, and information on target positions, the movement control device 10 solves a constrained optimization problem to calculate control input for M vehicles (Step S16). The movement control device 10 uses the number of prediction steps $N_{PH}$ to calculate the movement of vehicles satisfying the constraint conditions. In other words, at each step of movement routes for all vehicles, the movement control device 10 evaluates a deviation between a vehicle and a target position, and calculates movement routes with which the deviations are small as movement routes for all vehicles.

The movement control device 10 calculates control input for a vehicle for unit time based on the calculation results (Step S18). The unit time is a time shorter than a time corresponding to the number of prediction steps. The movement control device 10 evaluates a movement route for a time longer than a time for actually moving the vehicle with control input by (number of prediction steps·unit time) to calculate a movement route, and calculates control input for movement for the unit time based on the calculation results. The movement control device 10 updates the time after the lapse of the unit time (Step S20). The movement control device 10 determines whether the processing is to be finished (Step S22). When the movement control device 10 determines that the processing is not to be finished (No at Step S22), the procedure returns to Step S11, and when the movement control device 10 determines that the processing is to be finished (Yes at Step S22), this processing is finished.

By calculating the movement routes as described above, as illustrated in FIG. 4, the movement control device 10 calculates movement routes 130, 132, and 134 used for vehicles B1, B2, and B3 to arrive at respective target positions 120, 122, and 124 in a target region 110 in which there are a plurality of obstacles 102. The route for the vehicle B1 to the target position 120 is the movement route 130. The route for the vehicle B2 to the target position 122 is the movement route 132. The route for the vehicle B3 to the target position 124 is the movement route 134. For the movement routes 130, 132, and 134, positions 140 and 142 are calculated for each predictive step. The movement control device 10 performs optimization calculation so as to satisfy the constraint conditions at the position at each predictive step. In this manner, the movement control device 10 can calculate the movement routes that take the time series into consideration such that other vehicles B are allowed to pass through the same region as long as time steps are different. The movement control device 10 calculates the movement routes 130, 132, and 134, and creates and outputs control input that controls the movement until the next unit time, that is, predictive step n=0.

The movement control system 1 uses the concept of model predictive control to predict (looks ahead) a movement route satisfying constraint conditions where the predictive steps are $N_H$, uses an evaluation function, evaluation of which becomes higher as the distance becomes shorter in the relation between the vehicle B and the target position at each predictive step to evaluate a deviation between the vehicle B and the target position related to positions of all vehicles at all predictive steps, thereby calculating a movement route, and determines the movement for a unit time based on the calculated movement route.

In this manner, when the vehicle has moved and moves next, it is possible to suppress occurrence of deadlock, which does not allow the vehicle to move while satisfying constraint conditions when moving in a movable region of the vehicle, so as to suppress the occurrence of traffic jam of the vehicles. The optimization calculation can be performed with a plurality of constraint conditions being taken into consideration at the same time. Furthermore, by setting a region in which the vehicle cannot move by an obstacle, a movement route with a higher degree of freedom than that in the case of setting a movable route can be calculated. Even when the arrangement state of obstacles in a target region has changed, a movement route corresponding to the arrangement in a target region can be calculated by updating obstacle information as constraint conditions without recreating information on paths.

Second Embodiment

Next, a second embodiment is described. The same configurations as in the first embodiment are denoted by the same reference symbols, and descriptions thereof are omitted. Unless otherwise specified, the second embodiment is similar to the first embodiment.

A movement control system 1 in the present embodiment sets a predictive number of steps $N_H$ based on a distance to a target position of a vehicle and moving speed of the vehicle. In the movement control system 1, when a distance from the current position of a vehicle B to a destination is represented by $L_G$ and assumed average velocity of the vehicle B is represented by $v_{ave}$, the time of arrival $T_G$ at the destination is expressed by $T_G=L_G/v_{ave}$. The cycle of each predictive step is represented by $T_c$. The movement control system 1 sets the predictive number of steps $N_H$ to a minimum integer satisfying $N_H>(T_G/T_c)\times\alpha$. $\alpha$ is a coefficient for obtaining a sufficient margin to arrival at a destination, and is a value ($\alpha>1$) larger than 1, where $\alpha$ is set in advance.

The movement control system 1 may set the predictive number of steps $N_H$ to a minimum integer satisfying $N_H>(T_G/T_c)+N_\alpha$. $N_\alpha$ is the number of steps for margin, and is an integer ($N_\alpha>0$) larger than 0.

The movement control system 1 in the present embodiment sets the predictive number of steps $N_H$ based on a distance to a set target position, and hence can prevent the calculation amount from being increased more than necessary without reducing the accuracy of calculation of the movement route. In the movement control system 1 in the present embodiment, the time for prediction steps can be set to be longer than a time necessary for multi-vehicle to arrive at respective target positions. In this manner, movement routes for vehicles to arrive at respective target positions can be calculated. Specifically, by setting the number of prediction steps satisfying (calculation cycle)×(vehicle moving speed)×(number of prediction steps)>(distance between vehicle and target position), a route to a target position can be calculated. In this manner, the processing can be advanced based on a prediction movement route to the target position. In the movement control system 1 in the present embodiment, when a vehicle has arrived at a target position, the vehicle does not have influence on the evaluation of the evaluation function. Thus, even when the predictive number of steps $N_H$ is not changed, the same movement route is calculated.

Third Embodiment

Figure 5:
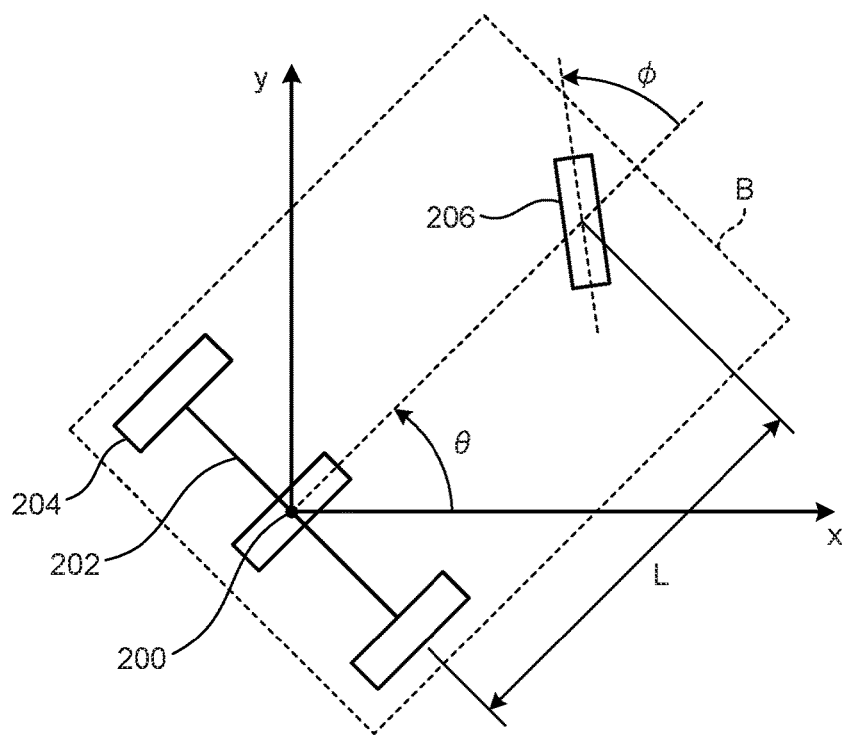
FIG. 5 is a schematic diagram illustrating an example of processing performed by a movement control system in a third embodiment.

Next, a third embodiment is described. The same configurations as in the first embodiment are denoted by the same reference symbols, and descriptions thereof are omitted. Unless otherwise specified, the third embodiment is similar to the first embodiment. FIG. 5 is a schematic diagram illustrating an example of processing performed by a movement control system in the third embodiment.

In the movement control system 1 in the present embodiment, mechanical constraint conditions of a vehicle are included as constraint conditions in addition to the evaluation function and the constraint conditions in the above-mentioned embodiments. For example, when an AGF or an AGV to be driven and operated with tires is used as a vehicle, the turning radius of the body of the vehicle is limited by a steering angle limit. A vehicle B illustrated in FIG. 5 is a three-wheeled model including two rear wheels 204 serving as driven wheels, which are connected by an axle 202 passing through a center 200, and a front wheel 206 serving as a steering wheel and a driving wheel. When the steering angle of the front wheel 206 is represented by φ, the distance between a center 200 and the axis of the front wheel 206 (length of wheelbase) is represented by L, the speeds in the x-axis direction and the y-axis direction are represented by x' and y', the velocity of the vehicle is represented by v, the rotation angle (yaw) of the vehicle is represented by θ, so that a vehicle B of a three-wheeled model is approximated by an equivalent two-wheeled model, the driving system of the three-wheeled vehicle illustrated in FIG. 5 is represented by:

$$\dot{x} = v \cdot \cos\theta$$
$$\dot{y} = v \cdot \sin\theta$$
$$\dot{\theta} = \frac{v}{L} \cdot \tan\phi$$

From the above kinetic model, the constraint condition of the yaw rate by a steering angle limit $\phi_{lim}$ is represented by:

$$|\dot{\theta}| < \frac{v}{L} \cdot \tan\phi_{lim}$$

Also, v in the above expression is represented by:
$$v = \sqrt{u_{mx}^2 + u_{my}^2}$$

Here, v is velocity determined by control input obtained by optimization by model prediction. The movement control system 1 solves a constrained optimization problem by using the above-mentioned conditions in addition to the constraint conditions in the first embodiment and the second embodiment as constraint conditions, thereby calculating control input.

The movement control system 1 in the present embodiment takes mechanical constraint conditions of the vehicle into consideration in addition to the constraint conditions in the first embodiment and the second embodiment, and hence even when a nonholonomic vehicle is a control target, the movement control system 1 can output control input with which the vehicle can move. In this manner, a movement route that can be more reliably executed by a vehicle can be calculated to control the movement of the vehicle with high accuracy.

Fourth Embodiment

Figure 6:
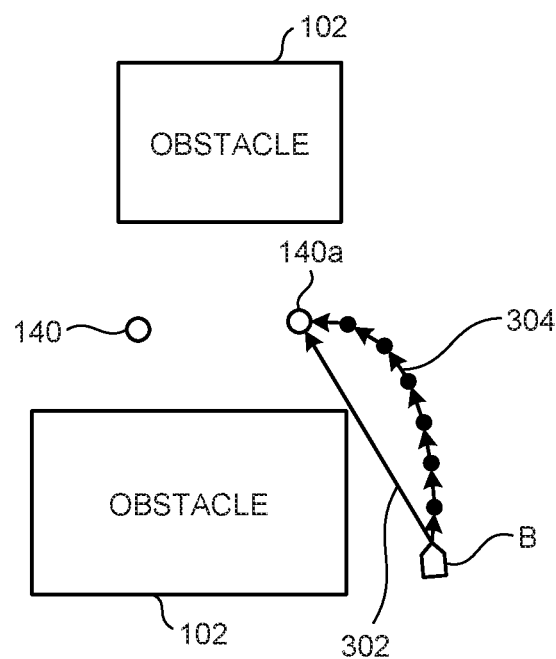
FIG. 6 is a schematic diagram illustrating an example of processing performed by a movement control system in a fourth embodiment.

Next, a fourth embodiment is described. The same configurations as in the first embodiment are denoted by the same reference symbols, and descriptions thereof are omitted. Unless otherwise specified, the fourth embodiment is similar to the first embodiment. FIG. 6 is a schematic diagram illustrating an example of processing performed by a movement control system in the fourth embodiment.

A movement control system 1 in the present embodiment concurrently calculates, based on information between locations on a movement route calculated by using the predictive number of steps $N_H$, a route to an adjacent location on the route, for example, a route from the current position to a location calculated at the next predictive step.

Similarly to the first embodiment to the third embodiment, the movement control system 1 uses the above-mentioned dynamics to plan a route to a target position in an arithmetic cycle $T_G$. The plan of the route to the target position calculated in the arithmetic cycle $T_G$ is referred to as "global route plan". A location calculated at each predictive step in the global route plan is referred to as "waypoint".

The movement control system 1 in the present embodiment uses a local system that operates with an arithmetic cycle (local route plan cycle) $T_L$ shorter than an arithmetic cycle (global route plan cycle) $T_G$ to create control input for the movement between waypoints in the global route plan and control the vehicle. The local arithmetic cycle $T_L$ is set to $T_L \ll T_G$, and calculation is performed with a faster cycle (shorter cycle) than the cycle in the global route plan. The local system calculates a position in the next cycle under the same constraint conditions as in the global route plan. The processing of the local system may be executed by the movement control device 10, or may be executed by each vehicle. The movement control system 1 calculates control input to control the movement of each vehicle based on position information for each arithmetic cycle $T_L$ calculated by the local system.

The movement control system 1 calculates target positions with the local route plan cycle $T_L$, and hence, as illustrated in FIG. 6, the movement from a movement route 302 calculated by the global route plan to the next waypoint 140 can be obtained as a movement route 304 connecting target positions calculated for each local route plan cycle T; by using the local system.

In this manner, by using the local system, the movement control system 1 can calculate movement routes based on the predictive number of steps such that control input is determined based on a more appropriate and detailed movement route satisfying constraint conditions by shortening the cycle without increasing the number of steps. In the local system, only a route from the current position to the next waypoint is calculated, that is, only a route for one step is calculated. Thus, the increase in arithmetic amount can be suppressed.

It is preferred that the local system do not calculate a movement route by setting the predictive number of steps and using prediction processing but calculate the position in the next arithmetic cycle TL based on the current time, the next waypoint, and the constraint conditions. In this manner, the increase in calculation amount for optimization calculation can be suppressed.

While the first embodiment, the second embodiment, the third embodiment, the fourth embodiment, the fifth embodiment, and the modification have been described above, the embodiments and the modifications can be combined as appropriate. In other words, the first embodiment, the second embodiment, the third embodiment, the fourth embodiment, and the fifth embodiment can each be used together with another embodiment without any conflict and inconsistency. The modification can be applied to the first embodiment, the second embodiment, the third embodiment, the fourth embodiment, and the fifth embodiment, and an embodiment in combination of the embodiments.

In the above description, model predictive control is applied to the calculation of control input of each of multiple vehicles B, but the method for calculating control input is not limited thereto. Nonholonomic models such as an equivalent two-wheel model of a vehicle may be used.

The embodiments and the modifications have been presented as an example, and are not intended to limit the scope of the invention. The embodiments and the modifications can be carried out in other various forms, and can be variously omitted, replaced, and changed within the range not departing from the gist of the invention. The embodiments and the modifications are encompassed in the scope and gist of the invention and similarly encompassed in the invention recited in the claims and its equivalents.

REFERENCE SIGNS LIST

1 Movement control system
10 Movement control device
20, 44, 53, 64 Communication unit
30, 43, 55 Control unit
31 Arithmetic unit
32 Storage unit
40 Management terminal
41 Input unit
42 Display unit
51 Position detection unit
54 Power unit
60 Vehicle detection device
62 Vehicle detection unit
B, B1, B2, B3 Vehicle
T, T1, T2, T3 Target position

The invention claimed is:

1. A method of controlling movement of multiple vehicles, the method comprising:
acquiring a constraint condition under which multiple vehicles move and a calculation cycle for calculating movement routes of the vehicles;
acquiring a position of each of all of the vehicles;
specifying a target position for each vehicle;
calculating, based on the position of each of the vehicles, the target position, and the constraint condition, a movement route for prediction steps of each of all of the vehicles;
determining, based on the movement route of each of all of the vehicles, a driving condition of each of all of the vehicles from a current time to a unit time; and
controlling movement of each of all of the vehicles,
wherein calculating the movement route includes performing an optimization calculation based on an evaluation function, evaluation of which becomes smaller as a deviation between each of all of the vehicles and the respective target position for each prediction step becomes smaller, and the constraint condition, obtaining an optimal control input $u_1(k) \ldots u_M(k)$ by solving the following constrained optimization function for each calculation cycle, and outputting the calculated control input to each of the vehicles:

$$\min_{u_1,\ldots,u_M} J(u_1, \ldots, u_M)$$
$$\text{s.t. } c(u_1, \ldots, u_M) \leq 0$$

wherein M is the number of vehicles, $u_1, \ldots, u_M$ is the respective control input, $J(u_1, \ldots u_M)$ is the evaluation function, and $c(u_1, \ldots, u_M)$ is the constraint, and
wherein calculating the movement route further includes setting a number of prediction steps satisfying: (the calculation cycle)×(moving speed of a vehicle)×(the number of prediction steps)>(distance between the vehicle and the target position).

2. The method according to claim 1, wherein the constraint condition includes position information on an obstacle located in a movable range of each of the vehicles and a lower limit value of a distance to the obstacle.

3. The method according to claim 1, wherein the constraint condition includes a lower limit value of a distance between a first one of the vehicles and a second one of the vehicles.

4. The method according to claim 1, wherein the constraint condition includes a limit value of a moving speed of each of the vehicles.

5. The method according to claim 1, wherein calculating the movement route further includes calculating a movement route of each of the vehicles based on a limit value for limiting variation in distance and direction of movement of each of the vehicles for a predetermined time.

6. The method according to claim 1, further comprising determining a driving condition of each of the vehicles to control the movement of each of all of the vehicles based on a position and a rotation of each of the vehicles after the unit time and a position and a rotation of the vehicle at a current time with a unit cycle shorter than the unit time.

7. The method according to claim 1, wherein calculating the movement route further includes calculating a movement route of each of the vehicles for the vehicles to arrive at respective target positions such that a time predicted by the prediction steps is longer than a time necessary for each of the vehicles to arrive at the target position.

8. The method according to claim 1, wherein calculating the movement route includes setting the number of prediction steps based on a moving speed of each of the vehicles and a distance between each of the vehicles and a respective target position.

9. The method according to claim 1, wherein calculating the movement route further includes calculating a movement route of each of the vehicles based on a rotation of the vehicle.

10. A device for controlling movement of multi-vehicle, the device comprising:
a communication unit that communicates with each of multiple vehicles to acquire information on current positions of the vehicles and acquire information on target positions of the vehicles; and
a control unit that acquires a constraint condition under which the vehicles move and a calculation cycle for calculating movement routes of the vehicles, calculates, based on the position of each of the vehicles, the target position, and the constraint condition, a movement route for prediction steps of each of the vehicles, and determines, based on the movement routes, a driving condition of each of the vehicles from a current time to a unit time to control the movement of the vehicles, wherein the control unit performs an optimization calculation based on an evaluation function, evaluation of which becomes smaller as a deviation between each of the vehicles and the respective target position for each prediction step becomes smaller, and the constraint condition, obtaining an optimal control input $u_1(k) \ldots u_M(k)$ by solving the following constrained optimization function for each calculation cycle, and outputting the calculated control input to each of the vehicles:

$$\min_{u_1,\ldots,u_M} J(u_1, \ldots, u_M)$$
$$\text{s.t. } c(u_1, \ldots, u_M) \leq 0$$

wherein M is the number of vehicles, $u_1, \ldots, u_M$ is the respective control input, $J(u_1, \ldots, u_M)$ is the evaluation function, and $c(u_1, \ldots, u_M)$ is the constraint, and wherein calculating the movement route further includes setting a number of prediction steps satisfying: (the calculation cycle)×(moving speed of a vehicle)×(the number of prediction steps)>(distance between the vehicle and the target position).

11. A system for controlling movement of multi-vehicle, the system comprising:
multiple vehicles; and
a movement control device that moves the vehicles,
wherein the movement control device includes:
a communication unit that communicates with each of the vehicles to acquire information on current positions of the vehicles and acquire information on target positions of the vehicles; and
a control unit that acquires a constraint condition under which the vehicles move and a calculation cycle for calculating movement routes of the vehicles, calculates, based on the position of each of the vehicles, the target position, and the constraint condition, a movement route for prediction steps of each of the vehicles, and determines, based on the movement routes, a driving condition of each of the vehicles from a current time to a unit time to control the movement of the vehicles, wherein the control unit performs an optimization calculation based on an evaluation function, evaluation of which becomes smaller as a deviation between each of the vehicles and the respective target position for each prediction step becomes smaller, and the constraint condition, obtaining an optimal control input $u_1(k) \ldots u_M(k)$ by solving the following constrained optimization function for each calculation cycle, and outputting the calculated control input to each of the vehicles:

$$\min_{u_1,\ldots,u_M} J(u_1, \ldots, u_M)$$
$$\text{s.t. } c(u_1, \ldots, u_M) \leq 0$$

wherein M is the number of vehicles, $u_1, \ldots, u_M$ is the respective control input, $J(u_1, \ldots, u_M)$ is the evaluation function, and $c(u_1, \ldots, u_M)$ is the constraint, and wherein calculating the movement route further includes setting a number of prediction steps satisfying: (the calculation cycle)×(moving speed of a vehicle)×(the number of prediction steps)>(distance between the vehicle and the target position).

12. A non-transitory computer-readable storage medium stored thereon a computer program for moving multi-vehicle, the computer program causing a computer to execute processing comprising:
acquiring a constraint condition under which multiple vehicles move and a calculation cycle for calculating movement routes of the vehicles;
acquiring a position of each of the vehicles;
specifying a target position for each vehicle;
calculating, based on the position of each of the vehicles, the target position, and the constraint condition, a movement route for prediction steps of each of the vehicles;
determining, based on the movement routes of the vehicles, a driving condition of each of the vehicles from a current time to a unit time; and
controlling movement of each of the vehicles,
wherein calculating the movement route includes performing an optimization calculation based on an evaluation function, evaluation of which becomes smaller as a deviation between each of the vehicles and the respective target position for each prediction step becomes smaller, and the constraint condition, obtaining an optimal control input $u_1(k) \ldots u_M(k)$ by solving the following constrained optimization function for each calculation cycle, and outputting the calculated control input to each of the vehicles:

$$\min_{u_1,\ldots,u_M} J(u_1, \ldots, u_M)$$
$$\text{s.t. } c(u_1, \ldots, u_M) \leq 0$$

wherein M is the number of vehicles, $u_1, \ldots, u_M$ is the respective control input, $J(u_1, \ldots, u_M)$ is the evaluation function, and $c(u_1, \ldots, u_M)$ is the constraint, and wherein calculating the movement route further includes setting a number of prediction steps satisfying: (the calculation cycle)×(moving speed of a vehicle)×(the number of prediction steps)>(distance between the vehicle and the target position).

* * * * *